Figure 1:
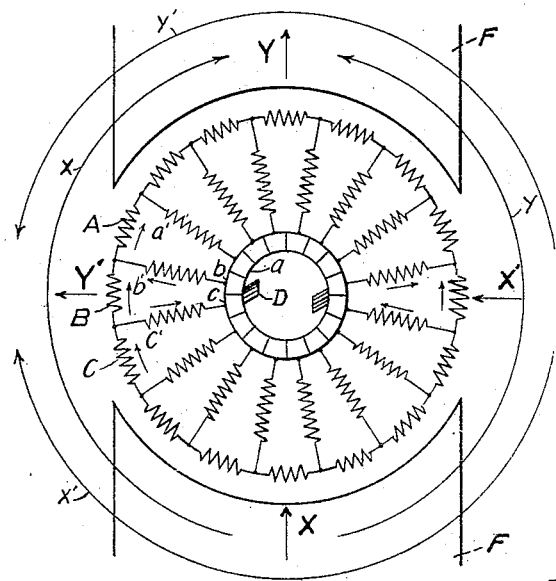

B. C. SHIPMAN.
WINDING OF ARMATURES FOR ALTERNATING CURRENT MOTORS.
APPLICATION FILED JAN. 29, 1906.

931,150.

Patented Aug. 17, 1909.

WITNESSES:

INVENTOR.
Bennet Carroll Shipman

UNITED STATES PATENT OFFICE.

BENNET CARROLL SHIPMAN, OF BALTIMORE, MARYLAND.

WINDING OF ARMATURES FOR ALTERNATING-CURRENT MOTORS.

No. 931,150.  Specification of Letters Patent.  Patented Aug. 17, 1909.

Application filed January 29, 1906. Serial No. 298,348.

*To all whom it may concern:*

Be it known that I, BENNETT CARROLL SHIPMAN, a citizen of the United States, residing in the city of Baltimore, State of Maryland, have invented certain new and useful Improvements in the Winding of Armatures for Alternating-Current Motors, of which the following is a specification.

My invention relates to that class of alternating current motors known as commutator motors, and sometimes spoken of as single phase motors, but my invention is not limited to motors operated as single phase, or even to motors themselves, but is equally applicable in some cases to self-exciting alternating current generators.

The object of my invention is the suppression of the detrimental heating and sparking due to the short-circuiting by the brush of two commutator bars when the coils connected to the same are in an E. M. F. producing field. Several methods have been proposed and used with this object in view, the most successful of which is the introduction of a certain amount of resistance in the leads from the coils on the armature to the commutator bars. But the use of this resistance, while suppressing destructive sparking and making an alternating commutating motor at all practicable, does not totally suppress the short circuit current, and hence heats the motor up far beyond what would be the case if it were totally suppressed, and what should correspond to the output of the motor. Furthermore the use of resistance for this purpose limits the applicability of such a motor in regard to the permissible frequency of the supply circuit. For, as the short circuited E. M. F. increases in proportion to the frequency with a given field strength, the amount of resistance in the leads between coils and commutator bars would have to increase in the same proportion, thus increasing the amount of heat lost in such resistance, and detracting by so much from the sustained capacity of the motor. Thus such motors are not applicable to any but the lowest frequency systems, comparatively few of which, outside of transmission systems, are ever installed. Even on low frequency systems the detrimental effects of the short circuit current is only minimized and not prevented.

My invention completely overcomes and prevents the short circuit current between commutator bars ordinarily due to the short circuiting by the brush. Being no short circuit current there can be no heating or sparking due to the same. To accomplish this I cause to be generated in the leads connecting any armature coil to the commutator bars under short circuit an active E. M. F. substantially equal and opposite to that existing in the said armature coil at the time of its short circuit by the brush. This E. M. F. is generated by the same lines of force which cause that of the armature coil, and hence it is evident that whatever the frequency of the supply circuit, the equality fixed in the design of the motor will hold good, so that a motor equipped with my invention can operate satisfactorily, so far as short circuit currents in the armature are concerned, on any commercial frequency.

Figure 3:
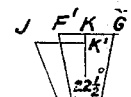

Figure 1 is a diagrammatic view of a two pole dynamo electric machine with a ring wound armature showing the auxiliary or commutating coils placed directly between the junctions of the main armature sections and the commutator bars, in order to illustrate more clearly the action of such auxiliary coils. In the structure of my invention they are not so placed, but as in Fig. 2, where they are shown wound about the armature core, and in approximately their proper place in reference to the coils to which they connect. Fig. 3 is a vector diagram of the voltages produced in sections of the armature auxiliary winding, or of the flux cut by such winding, when the bars, to which the said sections of auxiliary winding are connected, are about at the commutative position.

Figure 2:
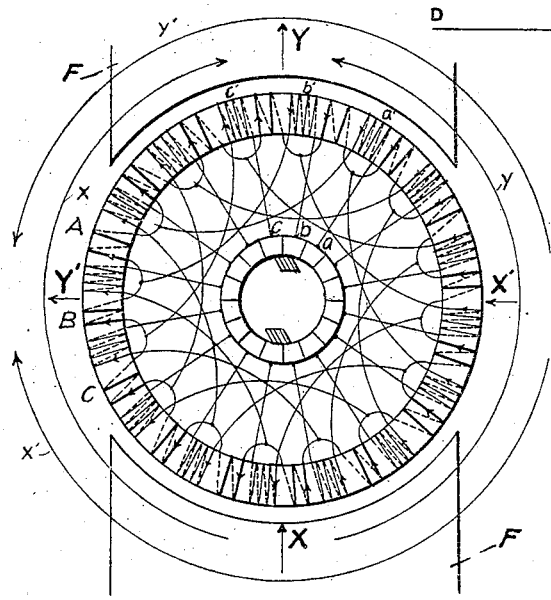

Describing my invention more in detail, I will refer now to Figs. 1, 2 and 3.

Fig. 1 is a diagrammatic view of a two pole dynamo electric machine with a ring armature. I show this type of armature as it makes the connections and windings clearer. My invention is equally applicable to drum wound armatures. Also for commercial reasons the drum wound type is preferable. F F are the poles of the machine; $a\ b\ c$ bars of the commutator; A B C main armature coils; $a'\ b'\ c'$ auxiliary coils through which the armature windings are tapped to the commutator bars. In an ideal case the flux enters the armature and passes equally around both sides of the core, so that it might be considered as entering at the point, X, and leaving at the point, Y. This field flux in the case of an alternating current motor however is alternating also, and hence generates E. M. F.'s in all armature coils except those under the points X Y, quite independent of any rotation of the armature. This E. M. F. is generally useless and always detrimental from a commutative point of view. In a two pole motor the points of maximum E. M. F. of this kind in the armature would be at the points X and Y, the E. M. F. of one half of the armature opposing and equaling that of the other half, being indicated in Figs. 1 and 2 by the curved arrows $x$ and $y$. The points of maximum E. M. F. due to rotation, useful counter E. M. F., would be at the points X' and Y', and would exist in the halves of the armature indicated by the curved arrows $x'$ and $y'$. It is evident also that the coils in which are generated the greatest E. M. F. due to the alternating field, (which I shall hereafter call the detrimental E. M. F. in contradistinction to the ordinary and useful E. M. F. of an armature due to rotation) will occupy a position under the line X' Y', in other words just the proper position for commutation. The heavy current from this detrimental E. M. F. is what in all previous motors has been limited but not prevented by connecting the coils to the commutator bars through some comparatively high resistance. In my invention I avoid altogether any current due to this detrimental E. M. F. by connecting the coils of the winding to the commutator bars through other coils or auxiliary windings, which have generated in them an opposing E. M. F.

Referring to Fig. 1, the coil B is in its proper position for undergoing short circuit in commutation, as there is no useful E. M. F. generated in it. The lead from one side of coil B is led through an auxiliary coil $c'$ and thence to commutator bar $c$. The lead from the other end of coil B is led through another auxiliary coil $b'$ to the commutator bar $b$. In these auxiliary coils are generated by the same field flux that generates the detrimental E. M. F. in coil B, E. M. F.'s, whose sum is substantially equal to and opposing that of coil B, so that although brush D short-circuits bars $b$ and $c$ no current can flow in such short circuit as a result of the detrimental E. M. F. The auxiliary coils are so disposed around the armature that when the armature has rotated until the coil $b'$ has the former position of coil $c'$ the E. M. F. of coil $b'$ will have been reversed and oppose that of coil A instead of B, acting in conjunction with auxiliary coil $a'$ as coil $c'$ formerly acted with it. Similarly also all coils in succession, the sum of the E. M. F.'s generated in any two adjacent auxiliary coils in the commutative position remaining fairly constant through an arc of revolution at least equal to the width of a commutator bar—quite sufficient to secure satisfactory operation.

A consideration of Fig. 2 will make it clear how I secure the generation of proper E. M. F.'s and also the reversal of the E. M. F. in any lead as it passes from the position of $b'$ to that of $c'$ in Fig. 1. In Fig. 2 similar letters refer to similar parts, and a ring wound armature is again shown for simplicity's sake, as a drum winding would so confuse the different coils that they would be difficult to distinguish. As before the coil B is in its proper place for commutation. As before also the lead from one end of the coil B is lead through the auxiliary coil $c'$ to the commutator bar $c$. This auxiliary coil $c'$ is angularly displaced from the armature coil B, and occupies a place practically 90 electrical degrees from the auxiliary coil immediately ahead of coil B. The essential point is however that the auxiliary coil $c'$ shall have the field flux cutting it in the same sense as it cuts main armature coil B, which obtains if the auxiliary coil $c'$ occupies a position on the same side of the axis of the field X Y as the coil B. The other end of the coil B is led through auxiliary coil $b'$ to the commutator bar $b$. This auxiliary coil $b'$, also angularly displaced from the armature coil B, occupies a place practically 90 electrical degrees from the auxiliary coil immediately behind coil B. The essential point is that the auxiliary coil $b'$ shall have the field flux cutting it in the opposite sense from which it cuts the main armature coil B, which obtains if the auxiliary coil $b'$ occupies a position on the opposite side of the axis of the field X Y from the coil B. Under the above arrangement the generation of detrimental E. M. F.'s in the coils corresponding at some given instant to that indicated by the curved arrows $x$ and $y$ is shown by the arrow heads at each coil in Figs. 1 and 2. By following out the connections from main armature coil B to and through the short circuiting brush it will be noted that the E. M. F.'s in the auxiliary coils $b'$ and $c'$ oppose that of the coil B, and if the coils $b'$ and $c'$ are so wound as to make their E. M. F.'s sufficient the E. M. F. of coil B will be completely neutralized. It will also be noted that as the armature moves, for instance, from right to left, the E. M. F. of coil $c'$ will increase as more lines of force will cut it, while that of coil $b'$ will decrease for the opposite reason, until when the coil $b'$ occupies the position under the axis X Y there will be no E. M. F. in it. But as will be shown below the sum of the E. M. F.'s in any such two adjacent auxiliary coils, $b'$ $c'$, is practically constant from the position of forward coil occupying the neutral position under the axis X Y to the position of the following coil occupying the same position. Hence the detrimental E. M. F. of any coil, such as B, will be substantially balanced out through a considerable arc of revolution—quite sufficient to effect a thoroughly satisfactory commutation of a coil, B. It will also be noted that after any auxiliary coil, as $b'$, passes the neutral point under the axis X Y, where no E. M. F. is generated, the E. M. F. then generated is reversed in reference to that of its former position. This is necessary for the commutation of successive armature coils, for, from being the trailing connection from the coil B and having its E. M. F. generated for the purpose of balancing out the detrimental E. M. F. of coil B in conjunction with auxiliary coil $c'$, coil $b'$ is now the leading connection from main armature coil A, and has a suitable E. M. F. generated to balance out the detrimental E. M. F. of coil A in conjunction with auxiliary coil $a'$. It is also evident from the above description and from the figures that the E. M. F.'s generated in the auxiliary coils serves no other purpose than as described, and do not in any way interfere with the usual functions of the armature. Furthermore these auxiliary coils are only in circuit each one at the time and during the commutation of the particular armature coil to which it is connected.

The main armature coils are connected one to another as is usual in armatures, so that the main current does not have to traverse any auxiliary coils except those immediately connected to the commutator bars on which the brushes rest. These auxiliary coils are preferably made of copper and of as low resistance as the space for winding allows. Practically two of these coils are always in multiple conveying the current from the commutator to the winding. Hence the loss entailed by introducing such auxiliary coils is practically nothing, and as they suppress the so called short circuit current by opposing E. M. F.'s, there can not be the loss and heat incident to the use of resistance in the leads, which at most can only control and not suppress the detrimental current.

A short consideration of Fig. 3 will show that the sum of the E. M. F.'s in any two adjacent coils, as $b'$ $c'$, is approximately constant through an appreciable arc. In Fig. 3 if D E represents the phase and amount of flux cut by the main armature coil B in its maximum position, K G will represent to some scale the amount of flux cutting auxiliary coil $b'$, and F' K the amount to the same scale cutting auxiliary coil $c'$, all under the assumption of Fig. 1 that there are sixteen main armature coils and sixteen auxiliary coils, and that all coils occupy equal spaces on the periphery of the armature. The angle then embraced between adjacent coils of the same class will be $22\frac{1}{2}$ degrees.

As the auxiliary coil $b'$ makes an angle of $101\frac{1}{4}$ degrees with the coil B, the amount of flux cutting the coil $b'$ will be the total flux multiplied by the cosine of $101\frac{1}{4}$ degrees. The auxiliary coil $c'$ makes an angle of $78\frac{3}{4}$ degrees with the main coil B, and hence the amount of flux cutting it will be the total flux multiplied by the co-sine of $78\frac{3}{4}$ degrees. The co-sine of the above two angles are the same; hence the sum of the flux cutting the two coils $b'$ and $c'$ is equal to the total flux multiplied by twice the co-sine of $78\frac{3}{4}$ degrees in this case, or generally for any number of coils, twice the sine of half the angle between adjacent auxiliary coils. This is true for the position of the auxiliary coils, $b'$ and $c'$, occupying equidistant positions from the axis X Y. If the armature is imagined turned $11\frac{1}{4}$ degrees to the left, a half of a commutator bar, the flux cutting the coil, $c'$ would then be represented in Fig. 3 by J K', and as coil, $b'$ would then coincide with axis X Y, the flux cutting it would be zero. The sum of the flux of coil $b'$ and coil $c'$ would then be equal to the total flux multiplied by the co-sine of $67\frac{1}{2}$ degrees or the sine of $22\frac{1}{2}$ degrees. If the armature turned farther to the left the brush would leave the bar to which coil $c'$ is connected, and hence coil $c'$ is eliminated from further consideration. Similar reasoning can be applied if the armature were imagined turned to the right $11\frac{1}{4}$ degrees, at which point the flux cutting coil $c'$ would be zero, and the flux cutting coil $b'$ would equal the total flux multiplied by the sine of $22\frac{1}{2}$ degrees. Therefore it is evident from the above that an armature wound with these auxiliary coils can be moved through a given angle, and the sum of the E. M. F.'s in any two adjacent auxiliary coils will vary between a value proportional to the sine of the angle between adjacent auxiliary coils and a value proportional to twice the sine of one half the angle between adjacent auxiliary coils. In the case illustrated in Figs. 1 and 2 the variation would be $1\frac{1}{4}$ per cent. By increasing the number of coils this variation will be decreased, for as the angle is decreased the sine of the angle becomes more nearly equal to twice the sine of half the angle. It is evident therefore that the sum of the E. M. F.'s in any two coils, $b'$ and $c'$, adjacent to the field axis X Y can be kept practically constant through a considerable arc, and if the proper number of turns are wound on, equal to the E. M. F. of the coil whose ends they connect through the brush. Similarly it is possible to make the sum of the E. M. F.'s in these auxiliary coils varying instead of constant, by merely placing the auxiliary coil, in reference to the coil to be commuted and the axis X Y, in another place on the periphery of the armature. In the case of repulsion motors it would be desirable to have a varying sum of E. M. F.'s instead of a constant sum.

It is evident then that the use of my invention is not limited to the particular structures herein shown. To anyone skilled in the art it is evidently applicable to other types of motors and to drum wound armatures, and it is not material that the auxiliary coils should occupy positions midway between those of the main armature coils. The auxiliary coils may be and preferably are combined in the same slots with the main coils for commercial reasons. Nor do I limit my invention to those types of motors which have the line current introduced directly into the armature or revolving element, for it is equally applicable to the type of motor known as a repulsion or transformer motor, and to some forms of self exciting alternating current generators.

Owing to the fact that any one lead and auxiliary coil attached thereto carries the main current for only $\frac{2}{N}$th of the time, N being the number of commutator bars per pair of poles, the wire of the auxiliary coils can be of considerably smaller cross-section than the wire of the main armature coils, and hence a greater number of turns put in an equal space, without running the auxiliary coils at any greater heat than the main coils. This fact, while not affecting my invention theoretically, is of the utmost practical importance, as it enables me to produce a motor of a given horse power of practically the same size as present commercial motors at the same limits of temperature.

In my claims I use the words "active E. M. F." to mean an E. M. F. generated by the cutting of lines of force independent of the conductor, or the current therein, in which such E. M. F. is generated. This definition therefore excludes an E. M. F. due to ohmic or inductive drop, which only exists when the current causing the same flows. The active E. M. F. I refer to exists independent of any current flowing in the coil exhibiting such active E. M. F. I use the words "magnetic axis or center of field" to mean that portion or location in the field where the flux may be said to divide, part going one way around the armature and part the other. It is evident that the magnetic axis or center need not, and frequently does not, correspond to the geometrical axis or center.

Having described my invention, I claim and desire to secure by Letters Patent:

1. In an alternating current, commutative dynamo electric machine the combination of a field, armature, commutator and brushes with an auxiliary winding in independent sections upon the armature core, the consecutive sections of which auxiliary winding connect the consecutive junctions of the sections of the main armature winding to the commutator bars, any consecutive two of the said sections of the auxiliary winding being located on opposite sides of the magnetic center of that field of force which cuts, at the commutative position, the main armature section to which said two auxiliary sections are mutually connected, in order that a movement of the armature through a small arc shall effect a reversal, in reference to said field of force, of the position of the auxiliary section which acts as a trailing connection to said armature section.

2. In an alternating current, dynamo electric machine in combination, a field, an armature, a commutator, brushes, a main armature winding and an auxiliary armature winding, the sections of which are independent of each other and connect the junctions of the sections of the main armature winding to the commutator bars, and any two sections of which auxiliary winding are placed near and on opposite sides of the magnetic center of that field of force which passes through that main armature section when at its commutative position for which the said two auxiliary sections serve as commutator connections, for the purpose of causing said field to pass through the leading auxiliary section in one direction and through the trailing auxiliary section in the opposite direction, in order that the E. M. F.'s generated in the said two auxiliary sections may be added to each other in phase and oppose the E. M. F. generated, by the alternation of the field, in the said section of the main armature winding undergoing commutation.

3. In an alternating current dynamo electric machine in combination, a field, armature, commutator, brushes and an auxiliary winding on the armature, the sections of which are independent and symmetrically disposed, and serve as connections from the junctions of the sections of the main armature winding to the commutator, any two consecutive sections of said auxiliary winding, when acting as commutator connections to a main section undergoing commutation, being on opposite sides of the magnetic center of the field, whereby the alternations of the said field generate E. M. F.'s in the said auxiliary sections opposed to each other in space but in phase through the connection of commutator bars and brushes and opposed to the E. M. F. generated in the main armature section undergoing commutation.

4. In a dynamo electric machine, the combination of a field, an armature, commutator and brushes with an auxiliary winding on the armature, the sections of which are independent and connect the junctions of the sections of the main armature winding to the commutator, and which are of the same span as the main armature sections, but displaced around the periphery of the armature from the junction to which each one connects an amount sufficient to bring any section of the auxiliary winding near the magnetic center of the field when the section of the main armature winding is at its commutative position, but on one side of the magnetic axis when acting as a leading connection and on the other side of the magnetic axis when acting as a trailing connection from a main armature coil at its commutative position.

5. In an alternating current dynamo electric machine comprising a field, armature and winding, commutator and brushes, auxiliary sections of armature windings connecting each junction of the sections of the main armature winding to a commutative bar, any consecutive two such auxiliary sections being displaced around the armature from the location of the main armature section to which they connect—one of them a distance sufficient to locate it barely within the same inductive relation in space to the field as is the main armature section considered, and the other of the said two auxiliary sections a distance sufficient to locate it in the opposite inductive relation in space to the field as is the same said main armature section, at the time when the specified main armature section is undergoing commutation, whereby in the local circuit of one main armature section, commutator bars and brushes, there will always be two auxiliary sections, through which the field flux passes in an opposite sense mutually in reference to space, but in the same sense mutually in reference to the local circuit of which they are a part and in an opposite sense to that in which it passes through the main armature section forming part of this local circuit.

BENNET CARROLL SHIPMAN.

Witnesses:
M. H. JONES,
J. F. BRISCOE.